United States Patent [19]
Barrett et al.

[11] 3,831,031
[45] Aug. 20, 1974

[54] ZONE PLATE IMAGING SYSTEM

[75] Inventors: Harrison H. Barrett, Lexington; Gordon D. Demeester, Marlboro; David T. Wilson, Bedford, all of Mass.

[73] Assignee: Raytheon Company, Lexington, Mass.

[22] Filed: Sept. 15, 1972

[21] Appl. No.: 289,707

[52] U.S. Cl................ 250/363, 250/320, 250/323, 250/368, 250/237 G, 350/162 ZP, 250/367
[51] Int. Cl.............................................. G01j 39/18
[58] Field of Search..... 250/213 R, 213 VT, 71.5 R, 250/71.5 S, 83.3 R, 65 R, 53.1, 363, 320, 323, 368, 237 G, 367; 350/162 ZP

[56] References Cited
UNITED STATES PATENTS

| | | | |
|---|---|---|---|
| 2,679,474 | 5/1954 | Pajes.................................. | 250/53.1 |
| 3,129,335 | 4/1964 | Stewart............................ | 250/237 R |
| 3,320,418 | 5/1967 | Steel................................ | 250/71.5 S |
| 3,509,338 | 4/1970 | Tajima.................................. | 250/65 |
| 3,569,997 | 3/1971 | Lehovec......................... | 250/83.3 R |
| 3,669,528 | 6/1972 | Richardson...................... | 250/237 G |

FOREIGN PATENTS OR APPLICATIONS 1,172,327 11/1969 Great Britain...................... 250/53.1

*Primary Examiner*—James W. Lawrence
*Assistant Examiner*—Harold A. Dixon
*Attorney, Agent, or Firm*—Jospeh D. Pannone; Milton D. Bartlett; David M. Warren

[57] ABSTRACT

A nuclear imaging system for mapping a spatially distributed source of high energy nuclear particles from a living organ which has selectively absorbed a radioactive compound in which the nuclear energy is spatially coded and modulated on a carrier for recording on a record medium as a shadow hologram in which signal strength and definition enhancement may be achieved by converting the amplitude hologram to a phase hologram while reducing the size of the hologram to allow tomographic reconstruction of the nuclear energy source with a substantially coherent beam of light.

19 Claims, 5 Drawing Figures

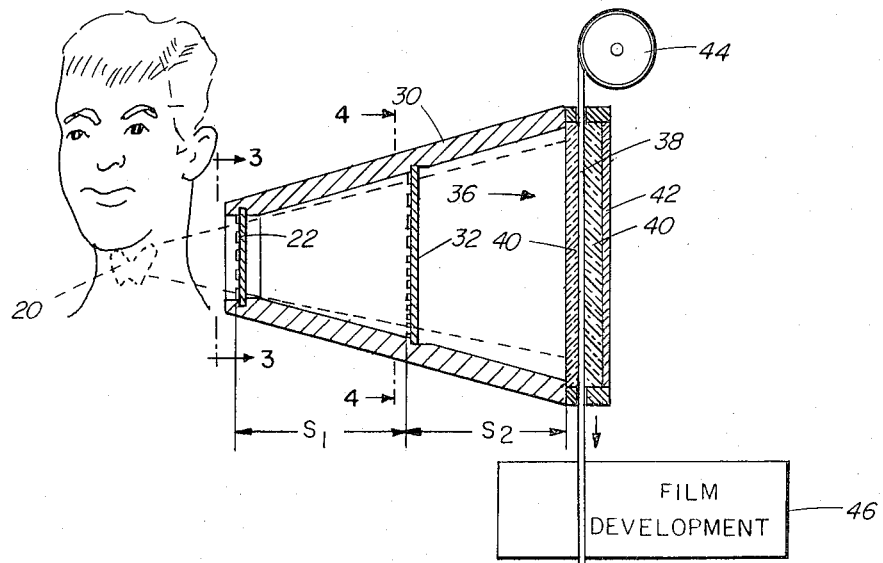
FIG. 1
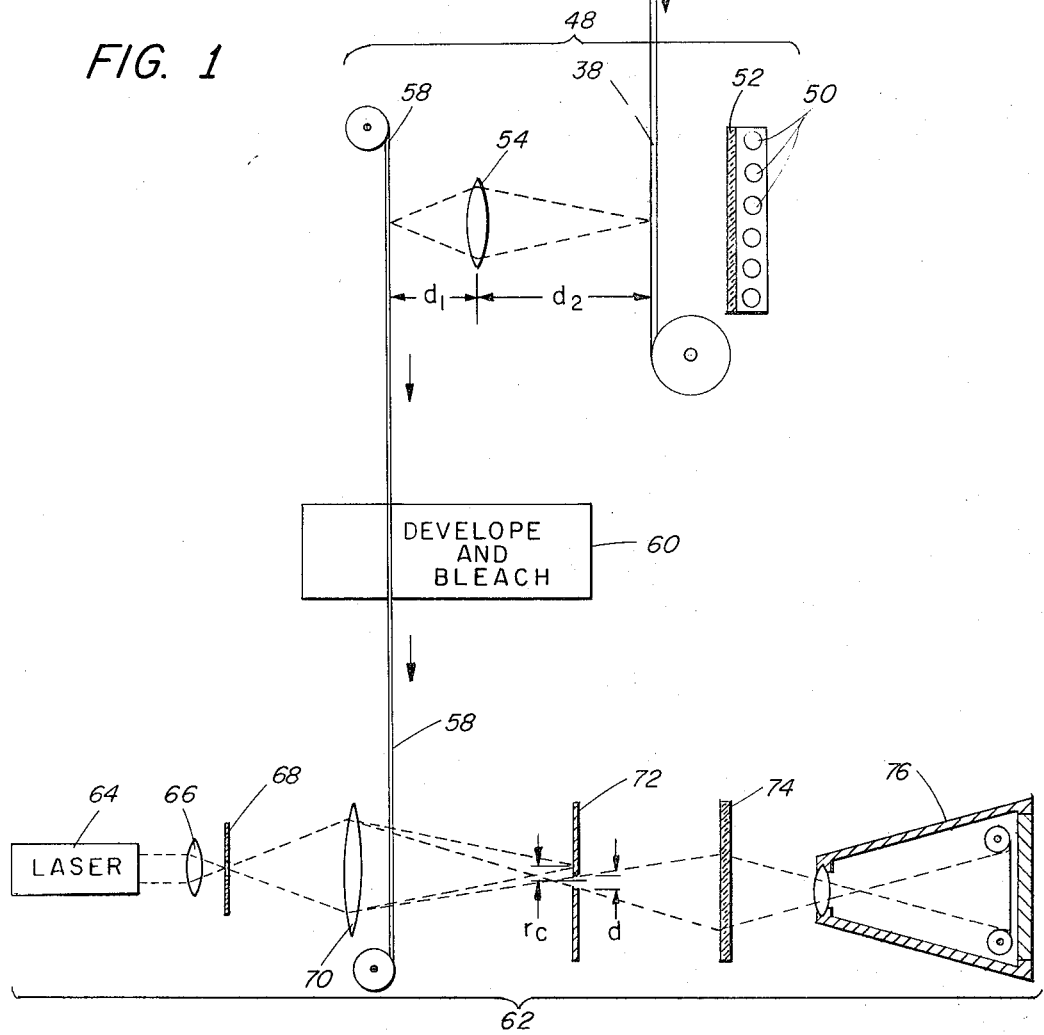

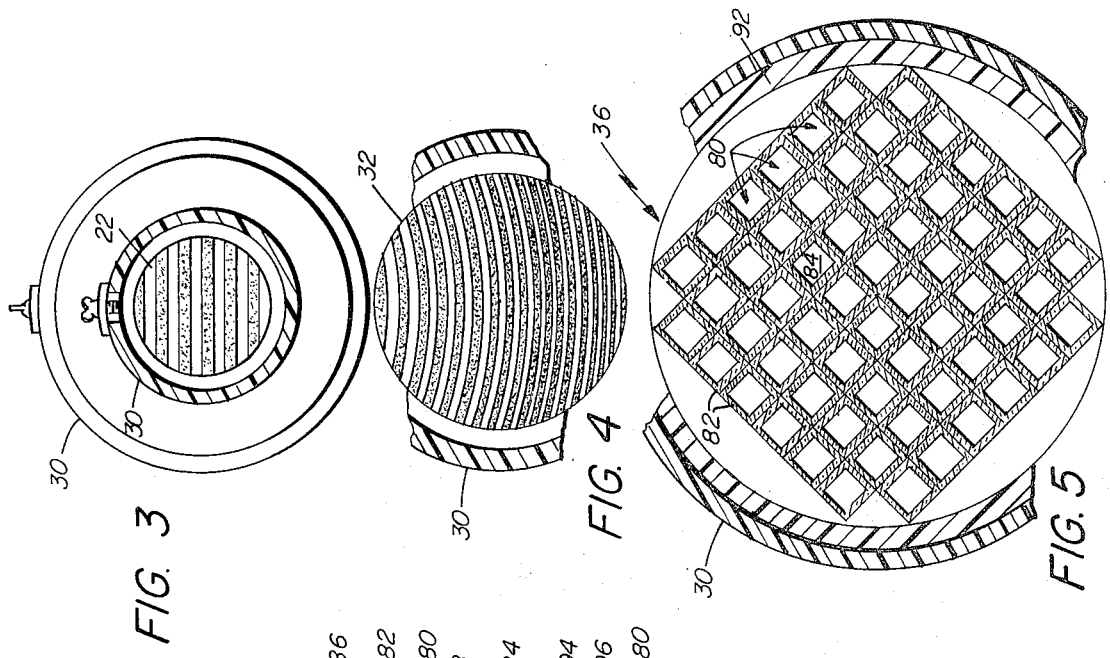
FIG. 3
FIG. 4
FIG. 5
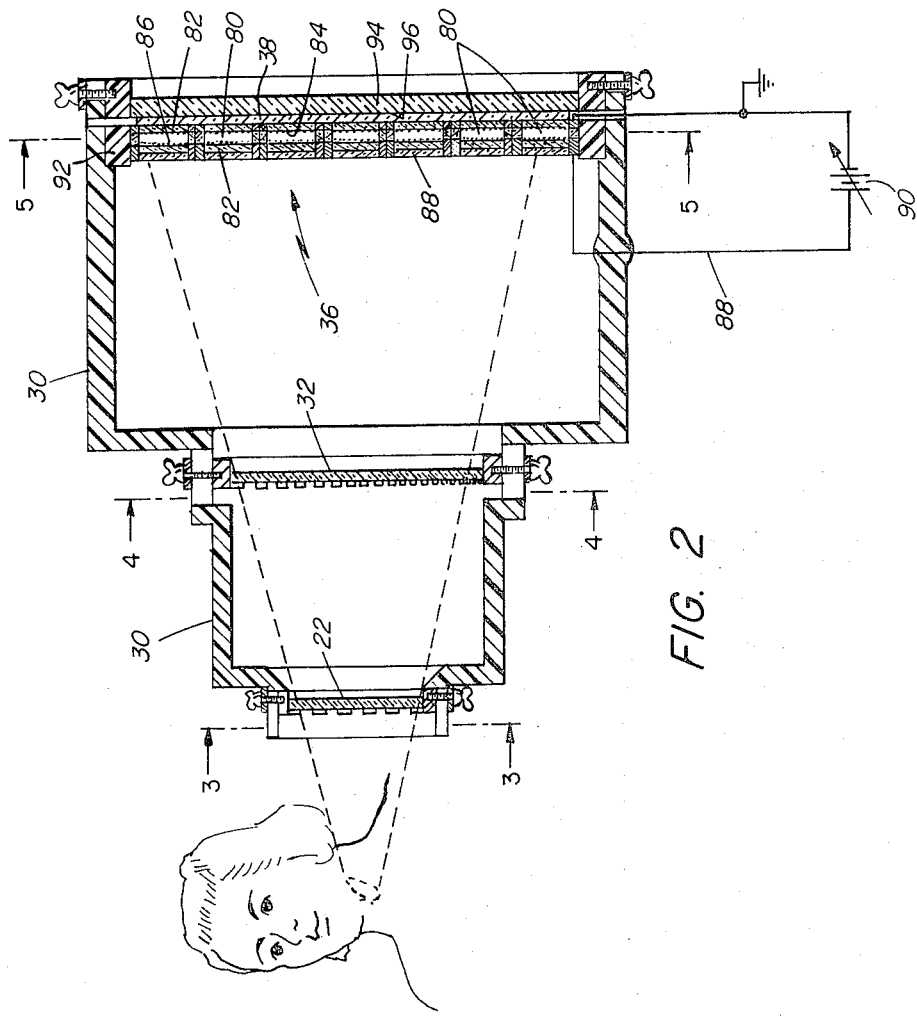
FIG. 2

ZONE PLATE IMAGING SYSTEM

RELATED CASES

Application Ser. No. 250,224, filed May 4, 1972 by Harrison H. Barrett, entitled Zone Plate Imaging System and assigned to the same assignee as this invention, is hereby incorporated by reference and made part of this disclosure.

BACKGROUND OF THE INVENTION

Apparatus for determining the location and condition of structures and/or organs in living bodies by detecting high speed particles emanating from regions of the body which have selectively absorbed radioactive compounds requires substantial exposure of the body to potentially harmful radiation and, hence, apparatus which reduces the dosage required to obtain an image of the structure or organ of sufficient definition and intensity to permit accurate diagnosis of the condition and location of the structure or organ is of paramount importance. Such definition is also a function of the length of time during which the body can as a practical matter be retained in an immobile position since movement of the body will cause substantial reduction in definition of the reconstructed image.

In addition, when the informational content of the high energy radiation pattern is recorded in spatially coded form, overlap of the recorded information for different points in the organ producing the high energy radiation can result in some loss of total signal strength and/or distortion or cross talk between different points of the nuclear energy source thereby resulting in a diminution of recorded information for a given length of exposure of the recording medium.

SUMMARY OF THE INVENTION

In accordance with this invention a spatially coded pattern from a source of high energy radiation may be recorded in which signals from adjacent regions of the radioactive source when spatially coded can be recorded in the same location on the record medium while minimizing loss of signal intensity and/or definition between the adjacent signals. More specifically, the record medium may be a film positioned adjacent or between layers of material which convert nuclear energy particles into light to expose the film. Preferably, the thickness and/or other parameters of the recording film are chosen such that a plurality of scintillations of light produced by a plurality of high energy particles are required to completely expose an elemental area of the film. Thus, overlapping signal regions are preserved by differing degrees of exposure of elemental areas of the film. As a result, zone plate spatially coded holographic amplitude detection patterns may be produced in which the number of the high energy particles emanating from the source which can be detected to produce recorded information is several orders of magnitude greater than the number of particles detected with presently available apparatus such as the conventional Anger camera in which the image is detected from particles passing through a lead collimating or pinhole imaging structure which excludes most of the high energy particles from the detecting region.

This invention further discloses that by recording the information in holographic form, background sources of radiation or other noise can be made to cancel during the reconstruction process thereby resulting in a substantial improvement in signal to noise ratio. More specifically, by the use of a zone plate made up of alternate regions of material which are opaque to the desired energy level emanating from the signal to be imaged interspersed with regions which are substantially transparent to such energy level, the desired energy signal may be coded while by the choice of the material and thickness of the intermediate region, energy levels below the desired energy level may be absorbed by the zone plate and energy levels above the desired energy level coming from other portions of the body or from outside the body can be transmitted through all regions of the zone plate and substantially cancelled in the subsequently formed image.

In addition, since any high energy particles produced by Compton scattering from regions between the zone plate and the recording region may be made to substantially cancel in the subsequent image formation (they are substantially spatially uncoded by the zone plate), further image clarity results.

This invention further discloses that formation of an image can efficiently be accomplished by converting the amplitude hologram recorded on one film to a phase hologram by processing an amplitude pattern on a film to convert the regions of varying opacity into substantially transparent regions which vary in thickness and/or in the velocity of the light transmitted therethrough thereby producing varying degrees of refraction of a beam of light directed therethrough. Since such a holographic pattern is substantially transparent, all of the overlapping gradations of opacity due to different numbers of light scintillations having struck different elemental areas of the original film are converted into different degrees of refraction and, therefore, the total signal content originally produced by the light scintillations in response to the high energy particles is available for the image reconstruction process. As a result, for some applications it is not necessary to provide additional amplification of the light scintillation before recording on the film.

This invention further discloses that effects such as distortion in the reconstruction due to fringe spacing being large compared to the wavelength of the reconstructing beam may be reduced. More specifically, since the ring spacing of a practical zone plate formed as an off-center section of a Fresnel zone pattern is large compared with the wavelength of conventional available laser light sources, substantial areas between the rings will not be effective in the reconstruction process. However, in accordance with this invention, by reduction in size of the recorded hologram the fringe spacing may be reduced to the range where distortion from this source is minimized. In addition, a substantial increase in the refraction of the phase hologram occurs which increases the intensity and/or clarity of the subsequently formed image.

This invention further discloses that the system may be improved by the use of a half tone screen, preferably positioned adjacent to the object being imaged, consisting of a plurality of bars of alternate transparency and opacity to particles from the body organ with the spacing being chosen to project a pattern on the detecting region which is within the spatial frequency response of the detecting and recording apparatus. More specifically, the spacing is chosen to break up large areas of the object such that it appears as a plurality of smaller sources. Since the half tone screen is spaced from the zone plate, modulation of the half tone screen spatial pattern with the zone plate pattern occurs such that the spatial code of the zone plate appears as sideband modulation on the half tone screen spatial frequency carrier.

This invention further discloses that any desired degree of exposure of an elemental area of the recording film may be chosen by choice of the thickness of the film and/or the thickness of the structure for converting the high energy particles into a scintillation of light. In addition, a light intensifier structure may be used between the recording film and the scintillation crystal which converts the high energy particles into scintillations of light, in which case the recording film may be substantially completely exposed in an elemental area for each scintillation of light produced. Alternatively, only a miniscule part, for example 1 percent, of the total possible exposure of an elemental area of the film may be produced by each scintillation, and the amount of exposure can be adjusted by adjusting the amount of amplification of the light intensifier system.

This invention further discloses that in practical apparatus the scintillator crystal and/or the light amplifying structures may be formed as a plurality of elements having commercially feasible sizes, with such elements being assembled to form a large matrix of elements and the edge effects of such elements minimized by making such elements substantially rectilinear, with the projections of the edges on the recording film extending at substantially symmetrical angles, such angles being preferably on the order of 45° so that such edge effects substantially cancel and do not appear in the subsequently formed image.

BRIEF DESCRIPTION OF THE DRAWINGS

Other and further objects and advantages of this invention will be apparent as the description thereof progresses, reference being had to the accompanying drawings wherein:

FIG. 1 illustrates an embodiment of the invention in which an image is recorded on a film as a spatially coded amplitude pattern which is reproduced in reduced size as a negative on a film which is then bleached to convert the amplitude hologram to a phase hologram from which images of the object may be reproduced;

FIG. 2 illustrates a modification of the apparatus illustrated in FIG. 1 wherein scintillations of light produced by the high energy particles are intensified prior to recording;

FIG. 3 is a sectional view of the half tone mask of FIGS. 1 and 2 taken along line 3—3 of FIGS. 1 or 2;

FIG. 4 is a sectional view of the structure of FIGS. 1 or 2 taken along line 4—4 of FIGS. 1 or 2 showing the spatial coding zone plate; and FIG. 5 is a sectional view of the structure of FIG. 2 taken along line 5—5 of FIG. 2 and illustrating the detector amplifier matrix.

DESCRIPTION OF THE PREFERRED EMBODIMENT

Referring now to FIG. 1, there is shown a source of radiation 20 which is illustrated herein, by way of example only, as a thyroid gland in a person which has been rendered radioactive by administering any of the well-known radioactive pharmaceuticals to the person. As is well known, the thyroid gland has an affinity for such radioactive pharmaceuticals. It is to be clearly understood that any desired source of radiation can be used and that such source may be, to any desired degree, a source of spatially coherent and/or temporally coherent waves. However, since this invention does not require such spatial and/or temporal coherence, it has been found particularly useful in those cases where the spatial coherence of the radiation is low or nonexistent.

Spatial coherence as used herein means that the wave amplitude at spatially separated points has a constant phase relationship. In contradistinction, incoherent radiation, such as incoherent light, has substantially no detectable phase relationship among spatially separated points. In addition, since this invention does not rely, in its broadest concept, on temporal phase coherence, radiation of such high energy as, for example, X-rays or nuclear particles, may be imaged even though their temporal coherence is extremely short since the radiation of one photon or energy particle bears substantially no phase coherence to other particles or portions of the radiation.

Temporal coherent time duration or length as used herein means the time it takes a packet of radiation including the major portion of its associated electric and/or magnetic fields to pass a given point. Alternatively, temporal coherence length may be defined as the distance along the direction of propagation between two points where a phase coherence between portions of the wave may be detected.

Positioned adjacent to radiation source 20 is a spatially periodic radiation absorbing structure 22 consisting, as illustrated in greater detail in FIG. 3, of a plurality of parallel bars 24 of material opaque to the radiation separated by spaces 26 equal in width to the width of the bars. As illustrated herein, the total open area of the mask 22 is made approximately equal to the total opaque area of the mask and may be referred to as a half tone screen. The material of the bars 24 is chosen such that the radiation from the source 20 will be absorbed if it hits the mask 22, but those portions of the radiation which are directed to the spaces 26 between the bars 24 will pass through. The resulting pattern of radiation on the opposite side of the source 20 from the mask 22 will then be a spatially coded pattern coded in accordance with a substantially periodic waveform whose intensity immediately adjacent the mask 22 varies from zero to substantially the average intensity of the source 20 positioned behind the mask 22. While the mask 22 may be placed at various distances from the source 20, it is preferably positioned as close as convenient to the source 20, and for the purposes of this discussion will be considered as being positioned at the source 20.

For convenience, periodic mask 22 may hereinafter be referred to as a half tone screen since it transmits approximately half of the energy impinging thereon and absorbs approximately half of the energy impinging thereon from the thyroid 20. Half tone screen 22 may be made, for example, by depositing a layer of lead on an aluminum plate and machining off portions of the lead to form effectively a lead half tone screen since the aluminum will transmit substantially all the gamma ray energy impinging thereon. It should be clearly understood that the thickness of the lead layer and the choice of the support plate may be made of any desired dimensions and spacing and, in general, are a function of the radioactive isotope being used. For example, with a thyroid absorption of 1 millicurie of either radioactive technetium or radioactive iodine, good resolution may be obtained with bar widths and spacings of a few millimeters, the degree of definition being determined in part by the length of exposure of the detector system to the patient, preferably such exposure being in the range of from 1 to 20 minutes and recording $10^6$ and $10^{10}$ counts, dependent on the size of the recording film and the length of exposure.

Since the number of counts detected in accordance with this invention is several orders of magnitude larger than the counts detected in the pinhole or collimating absorption lens system, greater definition may be achieved.

Half tone mask 22 is supported in a housing 30 which spaces the element 22 a predetermined distance $S_1$ from a spatial coding plate 32 formed in a similar manner to that as half tone screen 22 and having a pattern which is the off-center section of a Fresnel zone pattern as illustrated in FIG. 4. In general, the patterns of the masks 22 and 32 are by way of example only, and any desired patterns could be used, the patterns illustrated herein being simply those which have at present formed the clearest reproduction of images. While, as illustrated herein, masks 22 and 32 are planar, they may, if desired, be made as portions of spherical surfaces or cylindrcial surfaces or other geometric shapes.

Spaced from spatial coding plate 32, which may hereinafter be referred to as a zone plate or a Fresnel zone plate, is a detector system 36 illustrated herein as being substantially planar which if desired, may have a spherical, cylindrical or other geometric surface shape. Detector system 36 is generally positioned at an average distance $S_2$ on the opposite side of zone plate 32 from half tone screen 22. As illustrated herein by way of example only, detector system 36 comprises a layer of film 38 sandwiched between two thin layers 40 of crystal material such as cesium iodide or calcium tungstate which produces scintillations of light when struck by gamma radiation. A backing support plate 42, preferably of light reflecting metal, is used to support the layers of crystal 40 and the film 38 positioned therebetween. The front surface of the crystal 40 on the opposite side of film 38 from the support plate 42 may also have a thin layer of light reflecting material such as an aluminum or silver surface coated thereon and, if desired, the entire package of support plate 42, film 38 and crystals 40 may be assembled as a unitary package or cassette.

In operation, gamma rays from thyroid 20 pass through screens 22 and 32 as well as through crystal 40. Some of the gamma rays will produce scintillations of light in one or the other of the crystal layers 40 having an intensity strength enough to partially expose the elemental areas of the film adjacent the regions of the crystals producing the light scintillation. Preferably, the crystal layers 40 are made only a few millimeters thick so that definition in the pattern recorded on the film 38 is maintained in the millimeter range.

While the film 38 can be in a cassette, it is shown herein as a portion of a roll of film 44 drawn through the crystals 40 to illustrate the process steps involved. After exposure, the film 38 is developed in accordance with conventional practice by passing through a developer bath 46. Any desired degree of development can be used. Preferably, however, the film is developed sufficiently to provide maximum contrast between light and dark areas. The film 38 is then placed in a reducing system 48 which may be of a conventional type in which a light source 50 emanating from a ground glass screen 52 passes through film 38 and is focused on a film 58 through a lens 54 on the opposite side of film 38 from the light source 50. The focal length of lens 54 is chosen such that the light rays converge as passing therethrough and the shadow of film 38 is projected in reduced form on film 58 to expose film 58 and reproduce a negative of the pattern developed on film 38 in reduced form on film 58.

In accordance with this invention, the pattern on film 58 is reduced sufficiently so that the projection of the spacing of the half tone screen 22 in the pattern will be sufficiently close to produce a substantial degree of refraction of a visible light beam passing therethrough. This has been found to produce a substantial improvement in image reproduction, both from the standpoint of image distortion and image clarity or intensity.

Film 58 may, if desired, also be in the form of a cassette but is shown herein in the form of a roll of film to illustrate the subsequent steps of the process. Film 58 is passed through a conventional develop and bleach step illustrated at 60. The film 58 is of any desired conventional type which is developed to produce substantially the same or a greater degree of contrast as the original developed film 38 and is then bleached with any conventional film bleach to convert all of the light absorbing regions to a compound having a thickness and/or index of refraction different from the other regions of the film. In accordance with this invention, bleaching, in addition to enhancement of light transmission, is used as part of the conversion process from a shadowgraph pattern produced by non-coherent radiation into a refracting lens suitable for coherent light image reproduction in which size reduction of the image is used to further enhance the sensitivity and clarity of the reproduced image.

The film 58 is then used to reproduce an image of the thyroid 20 by a coherent light reproduction system 62. System 62 may be of any desired type and, as illustrated herein, comprises a source of coherent light 64 such as a helium neon laser whose output is focused by a lens 66 through a pinhole iris 68 to remove spatial modes. Light projected through the pinhole 68 passes through a converging lens 70 and then through the developed and bleached film 58 which diffracts the informational content of the picture away from the center line of the pinhole and lens system 70 by a distance $r_c$ so that it passes through a hole having a diameter $d$ in an iris 72 and appears as a reconstructed image in an image plane on any desired detection system such as a ground glass screen 74. The distance of screen 74 may be varied with respect to the film 58 to produce from the pattern recorded on film 38 various slices corresponding to various distances of radioactive thyroid 20 from the detector system 36. The aperture size $d$ and its offset $r_c$ from the iris 72 are functions of the diameter of the zone plate pattern of FIG. 4 and the distance which the center of the zone plate pattern of FIG. 4 is offset from the center of the Fresnel zone pattern. For example, if the diameter of the zone plate is equal to the offset of the center of the zone plate from the Fresnel zone pattern, the aperture size $d$ in the iris 72 is equal to the offset distance $r_c$ from the center of the system. As illustrated herein, the iris 72 is positioned substantially in the plane where the pinhole light from iris 68 would be focused by the lens 70 is the absence of film 58. It should be noted that small effects occur due to the film 58, and the precise positioning of iris 72 may be adjusted for optimum results.

The image produced on screen 74 may be viewed directly and/or several pictures taken for various positions of screen 74 by means of a camera 76. Alternatively, a television pickup camera may be used to view the reproduced image and/or to store images in a computer memory from which, if desired, simultaneous three-dimensional views of the object 20 may be reproduced. In accordance with this invention, an individual scintillation of light from the crystals 40 will not completely expose an elemental area of the film. Thus, overlapping patterns produced by adjacent point sources will substantially all be recorded with optimum intensity and a minimum occurrence of the condition where elemental areas of film are completely exposed so that additional scintillations of light occurring after each complete exposure go undetected. In accordance with this invention, the film 38 may be sufficiently thick for a given exposure time for such complete recording without saturation to occur since the portions of the film which are more completely exposed simply remain transparent to light in the reduction process. It should be noted that those portions which are still transparent pass the most light so that the reduced film 58 is a negative of the original film 38 causing a greater darkening of the negative 58. However, this also does not result in reduction in image intensity since all of the opaque regions are bleached and the net result is simply a small average increase in the refraction of the film. From the foregoing it may be seen that, by reason of the substantial signal amplification obtained by the reduction size of the film and the bleaching, this system may be used without light amplification prior to recording and under conditions where the definition of the image results primarily from the total number of counts recorded which is a function of the time of exposure of the detecting system. In addition, because of the large number of counts available compared with the prior pinhole or collimator type cameras, relatively thin scintillator crystals 40 may be used thereby permitting a detection definition substantially higher than those previously available. As a result, the fineness of the half tone screen and the finest line of the zone plate may be made substantially as fine as it is practical to fabricate such structures while still projecting patterns on the detecting surface which are within the spatial frequency pass band of the detecting system. Thus, a high definition shadow-type hologram of an object may be produced from an incoherent radiation source under conditions from which an image may be constructed using coherent light in the image-forming process.

Referring now to FIG. 2, there is shown a modification of the camera system of FIG. 1 wherein a housing 30 supports a half tone screen 22 and zone plate 32 identical to those illustrated in FIG. 1. The detector assembly 36, however, is provided with a means of light amplification in the following manner. A plurality of cells 80 are formed having glass walls 82. Preferably, cells 80 have a square shape and are nested together to form the matrix pattern illustrated in FIG. 5. Each of the cells 80 is preferably formed as an image intensifier in which an evacuated space separates flat faces of walls 82. On one of the inner faces there is a layer 84 of fluorescent material in the evacuated space and on the opposite face is a layer 86 of photoemissive material preferably deposited on a conductive coating which contacts a metal electrode extending through the edge wall 82 of the cell. Also preferably, the exposed surface of fluorescent layer 84 is coated with a thin layer of reflective material, such as aluminum, which is connected by an electrode extending through the edge wall 82 of the cell. Each of the cells 80, in addition, has a layer a few millimeters thick of scintillator material, such as cesium iodide 88, on the surface of the cell whose inner surface could be the photoemissive layer 86. As illustrated herein, all of the metal electrodes contacting the photoemissive coatings are connected together and via a lead 88 to the negative pole of a voltage source 90 while all of the electrodes connected to the aluminum surface contacting the fluorescent layers are connected together and via a ground wire to the positive terminal of voltage source 90. The individual cells are assembled in a support ring 92 acting as the grounding ring for contact to the leads extending through the cell walls to the aluminized surface, such cells being, for example, glued together or mounted in a multicontact conductive mount or otherwise assembled. Positioned on the opposite side of the cells 80 from the crystals 88 is a film 38 similar to the film 38 illustrated in FIG. 1, supported on a glass support plate 94 having a reflective surface 96 so that substantially all the light produced by the fluorescent screens is directed through the film one or more times to expose the film. In operation, the voltage supply 90 is adjusted such that a scintillation of light produced by a gamma ray striking the crystal 88 will cause photons emitted by the surface 86 to be accelerated toward the fluorescent screen 84 with sufficient velocity to produce a greater amount of light than the light produced by the crystal 88. The amount of light produced is a function of the voltage. By increasing the voltage, any desired amount of light may be generated. In practice, a voltage in the range between 100 and 10,000 volts is preferably used. In addition, a magnetic field may be produced by a coil wound around the array of cells outside the housing 30 to produce a field parallel to the direction of motion of electrons from the layer 86 to the layer 84 in accordance with well-known practice. In addition, any desired type of image intensifier cell may be used.

In accordance with this invention, in order to obtain image intensification of large areas uniformly, the individual cells are formed with their walls extending at an angle of substantially 45° to the pattern projected on the crystals 88 by the half tone screen 22. As a result, the edge pattern of the cells substantially cancels in the reproduction process carried out in accordance with the system of FIG. 1 and, thus, as a practical matter the image of the pattern can be amplified without the spatial distortion encountered in conventional image intensifier tubes where the image is reduced. In addition, advantage is taken of the fact that variations in the image intensification due to production tolerances between adjacent cells automatically cancels in the reconstructed image. Thus, it is not necessary that each cell be connected to its own individual power supply. Also, since the walls of the cells are oriented to project patterns, each cell may have its individual scintillation crystal 88 and the shadow patterns formed by the intersecting edges of adjacent crystals also cancel in the reconstructed image.

While in accordance with this invention, light amplification prior to recording is not essential for many applications, it is illustrated herein as an alternative for use where radioactive compounds are desired which have energy levels other than the optimum which may be detected, thereby requiring in some cases additional light amplification prior to recording to produce optimum definition and clarity in the reproduced image. Also, in those applications where exposure time of the detecting device is to be minimized because of the difficulty in maintaining the radioactive organ to be imaged motionless with respect to the detector as, for example, in the case of lungs which move during breathing, it is desirable to increase the light intensity encountered per flash to produce maximum intensity with a smaller number of counts. Thus, it may be seen that in accordance with this invention, any desired degree of exposure of a film may be achieved for each quanta of high energy detected by the system.

This completes the description of the embodiments of the invention illustrated herein. However, many modifications thereof will be apparent to persons skilled in the art without departing from the spirit and scope of this invention. For example, the longitudinal distortion produced in the system which is reduced by reduction in size of the film may also be reduced by the use of other correcting means such as a specially constructed correcting lens. A variety of other spatial coding patterns other than Fresnel zone patterns may be used, particularly if the reconstruction is to be accomplished by computer using appropriate transform programs, and the principles of the invention may be used in systems to detect any form of spatially distributed information signals which may appear in the detector as high energy or gamma rays, as X-rays or as any of the coherent radiation spectrum of electromagnetic waves as well as mechanical vibrations such as sonic or ultrasonic waves in acoustic holography. Also, it is contemplated that this invention may be used to form images of the shadows of organs having substances which absorb gamma radiation emanating from a source external to the living organism. Furthermore, while the ratio of the spatial frequency of the half tone screen to the average spatial frequency of the zone plate is preferably substantially equal to one plus the ratio $S_1/S_2$, where $S_1$ and $S_2$ are the distances, illustrated in FIG. 1, between the half tone screen and the zone plate and between the zone plate and the detector, respectively, any desired ratios of spatial frequencies and distances may be used.

Accordingly, it is contemplated that this invention be not limited by the particular details of the embodiments illustrated herein except as defined by the appended claims.

What is claimed is:

1. In combination:
   means for spatially modulating substantially non-phase coherent radiant energy as a function of a spatial code pattern comprising a plurality of masks spaced from each other in the average direction of said radiation;
   each of said masks having a plurality of regions substantially permeable to said radiation separated by intervening regions substantially less permeable to said radiation than said permeable regions;
   said intervening regions having a thickness in the average direction of said radiation which is less than average spacing between said permeable regions;
   means for deriving from said radiant energy pattern a spatially distributed pattern having an informational component representing the spatial distribution of a radiopharmaceutical selectively absorbed by an organ of living tissue and emitting said radiant energy in a medium in which the refraction of rays of radiant energy passing through said medium varies spatially as a function of said radiation pattern; and
   means for deriving an image from the informational content of said pattern.

2. The combination in accordance with claim 1 wherein said spatial code pattern comprises at least a portion of a Fresnel zone pattern.

3. The combination in accordance with claim 2 wherein said spatial code pattern comprises an off-center section of a Fresnel zone pattern convolved with a substantially constant spatial periodicity pattern.

4. The combination in accordance with claim 3 wherein said image deriving means comprises a substantially phase coherent source of radiation directed through said medium.

5. The combination in accordance with claim 4 wherein said means for detecting said pattern comprises a matrix of elements.

6. The combination in accordance with claim 5 wherein the projection of portions of the physical structure of said elements in the detected pattern form acute angles with respect to the projection of the spatially periodic pattern whereby substantial effects of the physical structure of said elements in said image are reduced.

7. The combination in accordance with claim 6 wherein said detecting means comprises a photographic film.

8. The combination in accordance with claim 6 wherein said detecting means comprises means for amplifying signals derived from discrete quanta of said radiant energy pattern.

9. The combination in accordance with claim 6 wherein said radiation pattern comprises gamma radiation and said detecting means comprises means for converting said radiation from a high-energy portion of the spectrum to a lower energy portion of the spectrum, means for amplifying said converted energy, and means for recording signals derived from said amplified imaging.

10. The process of forming an image of an organ of a living organism in which said organ contains a substance which emits and/or absorbs high-energy radiation comprising the steps of:
    spatially coding said radiations by a structure comprising a plurality of masks spaced from each other in the average direction of said radiation;
    each of said masks having a plurality of regions substantially permeable to said radiation separated by intervening regions substantially less permeable to said radiation than said permeable regions;
    said intervening regions having a thickness in the average direction of said radiation which is less than the average spacing between said permeable regions;
    forming in a medium a spatial pattern derived from said radiations in which indices of refraction and/or thickness of said medium very spatially as a function of at least a component of said radiation pattern; and projecting substantially coherent radiation toward said medium to form an image.

11. The process in accordance with claim 10 wherein said pattern formed in said medium is substantially reduced in size from an intensity pattern of said radiation.

12. The process in accordance with claim 11 wherein said intensity pattern is detected at least in part by converting said radiation emanating from and/or absorbed by said organ as high-energy radiation into a lower energy level of radiation.

13. The process in accordance with claim 12 wherein said intensity pattern is detected at least in part by recording said converted radiation in a radiation responsive element.

14. The process in accordance with claim 13 wherein said radiation is detected at least in part by amplifying said converted radiation.

15. The process in accordance with claim 10 wherein said pattern comprises an off-center section of a Fresnel zone pattern.

16. The process in accordance with claim 15 wherein said spatial pattern comprises a substantially constant spatial periodicity component.

17. The process in accordance with claim 16 wherein said spatial pattern is detected at least in part by a matrix of elements.

18. The process in accordance with claim 17 wherein projections of structural characteristics of said matrix form acute angles in said intensity pattern with said constant periodicity component.

19. The process in accordance with claim 18 wherein said matrix of elements comprises spatially distributed intensity amplifiers forming an amplified image of substantially the same size as the spatially coded pattern incident thereon.

* * * * *